United States Patent
Boutros et al.

(10) Patent No.: US 10,797,910 B2
(45) Date of Patent: *Oct. 6, 2020

(54) SPECIFYING AND UTILIZING PATHS THROUGH A NETWORK

(71) Applicant: Nicira, Inc., Palo Alto, CA (US)

(72) Inventors: Sami Boutros, Union City, CA (US);
Ankur Dubey, Santa Clara, CA (US);
Mike Parsa, Santa Cruz, CA (US);
Israel Cidon, San Francisco, CA (US);
Prashanth Venugopal, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,663

(22) Filed: Jan. 26, 2018

(65) Prior Publication Data

US 2019/0238364 A1   Aug. 1, 2019

(51) Int. Cl.
*H04L 12/46* (2006.01)
*H04L 12/803* (2013.01)
(Continued)

(52) U.S. Cl.
CPC .......... *H04L 12/4633* (2013.01); *H04L 45/38* (2013.01); *H04L 45/745* (2013.01);
(Continued)

(58) Field of Classification Search
CPC ... H04L 12/4633; H04L 45/38; H04L 45/745; H04L 47/125; H04L 49/9057; H04L 61/103; H04L 61/2592; H04L 2212/00; H04L 12/86; H04L 12/741; H04L 12/823; H04L 29/06; H04L 12/26; H04L 12/66;
(Continued)

(56) References Cited

U.S. PATENT DOCUMENTS 6,006,264 A   12/1999   Colby et al.
6,104,700 A   8/2000   Haddock et al.
(Continued)

FOREIGN PATENT DOCUMENTS

CN   1689369 A   10/2005
CN   101729412 A   6/2010
(Continued)

OTHER PUBLICATIONS

International Search Report and Written Opinion of Commonly Owned International Patent Application PCT/US2018/057181, dated Jan. 24, 2019, 12 pages, International Searching Authority (EPO).
(Continued)

*Primary Examiner* — Hardikkumar D Patel
(74) *Attorney, Agent, or Firm* — Adeli LLP

(57) ABSTRACT

For a multi-tenant environment, some embodiments of the invention provide a novel method for (1) embedding a specific path for a tenant's data message flow through a network in tunnel headers encapsulating the data message flow, and then (2) using the embedded path information to direct the data message flow through the network. In some embodiments, the method selects the specific path from two or more viable such paths through the network for the data message flow.

21 Claims, 7 Drawing Sheets

(51) Int. Cl.
*H04L 12/741* (2013.01)
*H04L 12/721* (2013.01)
*H04L 12/861* (2013.01)
*H04L 29/12* (2006.01)

(52) U.S. Cl.
CPC ........ *H04L 47/125* (2013.01); *H04L 49/9057* (2013.01); *H04L 61/103* (2013.01); *H04L 61/2592* (2013.01); *H04L 2212/00* (2013.01)

(58) Field of Classification Search
CPC ....... H04L 12/707; H04L 29/08; H04L 12/46; H04L 12/28; H04L 12/803; H04L 12/933; G06N 3/08; H04H 20/71; H04M 15/12
See application file for complete search history.

(56) References Cited

U.S. PATENT DOCUMENTS

| | | |
|---|---|---|
| 6,154,448 A | 11/2000 | Petersen et al. |
| 6,772,211 B2 | 8/2004 | Lu et al. |
| 6,779,030 B1 | 8/2004 | Dugan et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,230,493 B2 | 7/2012 | Davidson et al. |
| 8,266,261 B2 | 9/2012 | Akagi |
| 8,451,735 B2 | 5/2013 | Li |
| 8,484,348 B2 | 7/2013 | Subramanian et al. |
| 8,521,879 B1 | 8/2013 | Pena et al. |
| 8,615,009 B1 | 12/2013 | Ramamoorthi et al. |
| 8,743,885 B2 | 6/2014 | Khan et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,892,706 B1 | 11/2014 | Dalal |
| 8,914,406 B1 | 12/2014 | Haugsnes et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,191,293 B2 | 11/2015 | Iovene et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,599 B2 | 8/2016 | Koponen et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,602,380 B2 | 3/2017 | Strassner |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,075,470 B2 | 9/2018 | Vaidya et al. |
| 10,079,779 B2 | 9/2018 | Zhang et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,737 B2 | 11/2018 | Jain et al. |
| 10,212,071 B2 | 2/2019 | Kancherla et al. |
| 10,225,137 B2 | 3/2019 | Jain et al. |
| 10,257,095 B2 | 4/2019 | Jain et al. |
| 10,320,679 B2 | 6/2019 | Jain et al. |
| 10,341,233 B2 | 7/2019 | Jain et al. |
| 10,516,568 B2 | 12/2019 | Jain et al. |
| 10,594,743 B2 | 3/2020 | Hong et al. |
| 10,609,091 B2 | 3/2020 | Hong et al. |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0091396 A1 | 4/2005 | Nilakantan et al. |
| 2005/0114429 A1 | 5/2005 | Caccavale |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0130133 A1 | 6/2006 | Andreev et al. |
| 2006/0155862 A1 | 7/2006 | Kathi et al. |
| 2006/0233155 A1 | 10/2006 | Srivastava |
| 2007/0061492 A1 | 3/2007 | Riel |
| 2007/0214282 A1 | 9/2007 | Sen |
| 2007/0288615 A1 | 12/2007 | Keohane et al. |
| 2008/0005293 A1 | 1/2008 | Bhargava et al. |
| 2008/0031263 A1 | 2/2008 | Ervin |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0019135 A1 | 1/2009 | Eswaran et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0265467 A1 | 10/2009 | Peles et al. |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |

(56) References Cited

U.S. PATENT DOCUMENTS

| | | |
|---|---|---|
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0090912 A1 | 4/2011 | Shippy |
| 2011/0164504 A1 | 7/2011 | Bothos et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0185588 A1 | 7/2012 | Error |
| 2012/0207174 A1 | 8/2012 | Shieh |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0343378 A1 | 12/2013 | Veteikis et al. |
| 2014/0010085 A1 | 1/2014 | Kavunder et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0101226 A1 | 4/2014 | Khandekar et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0330983 A1 | 11/2014 | Zisapel et al. |
| 2014/0334485 A1 | 11/2014 | Jain et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0023354 A1 | 1/2015 | Li et al. |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063364 A1 | 3/2015 | Thakkar et al. |
| 2015/0071301 A1 | 3/2015 | Dalal |
| 2015/0109901 A1 | 4/2015 | Tan et al. |
| 2015/0124840 A1 | 5/2015 | Bergeron |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0288679 A1 | 10/2015 | Ben-Nun et al. |
| 2015/0372840 A1 | 12/2015 | Benny et al. |
| 2015/0372911 A1 | 12/2015 | Yabusaki et al. |
| 2015/0381494 A1 | 12/2015 | Cherian et al. |
| 2015/0381495 A1 | 12/2015 | Cherian et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0134528 A1 | 5/2016 | Lin et al. |
| 2016/0149816 A1 | 5/2016 | Roach et al. |
| 2016/0164787 A1 | 6/2016 | Roach et al. |

(56) References Cited

U.S. PATENT DOCUMENTS

| | | |
|---|---|---|
| 2016/0173373 A1 | 6/2016 | Guichard et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0277210 A1 | 9/2016 | Lin et al. |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1* | 10/2016 | Li .................. H04L 45/38 |
| 2016/0352866 A1 | 12/2016 | Gupta et al. |
| 2016/0366046 A1 | 12/2016 | Anantharam et al. |
| 2017/0005920 A1 | 1/2017 | Previdi et al. |
| 2017/0005988 A1 | 1/2017 | Bansal et al. |
| 2017/0063683 A1 | 3/2017 | Li et al. |
| 2017/0063928 A1 | 3/2017 | Jain et al. |
| 2017/0064749 A1 | 3/2017 | Jain et al. |
| 2017/0126497 A1 | 5/2017 | Dubey et al. |
| 2017/0142012 A1 | 5/2017 | Thakkar et al. |
| 2017/0149582 A1* | 5/2017 | Cohn .................. H04L 12/66 |
| 2017/0149675 A1 | 5/2017 | Yang |
| 2017/0230467 A1 | 8/2017 | Salgueiro et al. |
| 2017/0237656 A1 | 8/2017 | Gage |
| 2017/0295100 A1 | 10/2017 | Hira et al. |
| 2017/0310588 A1* | 10/2017 | Zuo .................. H04L 45/34 |
| 2017/0317954 A1 | 11/2017 | Masurekar et al. |
| 2017/0324651 A1 | 11/2017 | Penno et al. |
| 2017/0364794 A1* | 12/2017 | Mahkonen .............. H04L 43/10 |
| 2017/0373990 A1 | 12/2017 | Jeuk et al. |
| 2018/0041524 A1 | 2/2018 | Reddy et al. |
| 2018/0091420 A1 | 3/2018 | Drake et al. |
| 2018/0124061 A1 | 5/2018 | Raman et al. |
| 2018/0145899 A1 | 5/2018 | Rao |
| 2018/0159733 A1 | 6/2018 | Poon et al. |
| 2018/0159943 A1 | 6/2018 | Poon et al. |
| 2018/0198692 A1 | 7/2018 | Ansari et al. |
| 2018/0213040 A1 | 7/2018 | Pak et al. |
| 2018/0234360 A1* | 8/2018 | Narayana .............. H04L 69/166 |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0302242 A1 | 10/2018 | Hao et al. |
| 2018/0337849 A1 | 11/2018 | Sharma et al. |
| 2019/0020600 A1 | 1/2019 | Zhang et al. |
| 2019/0020684 A1 | 1/2019 | Qian et al. |
| 2019/0068500 A1 | 2/2019 | Hira |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0149512 A1 | 5/2019 | Sevinc et al. |
| 2019/0166045 A1 | 5/2019 | Peng et al. |
| 2019/0229937 A1 | 7/2019 | Nagarajan et al. |
| 2019/0238363 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0076684 A1 | 3/2020 | Naveen et al. |
| 2020/0076734 A1 | 3/2020 | Naveen et al. |

FOREIGN PATENT DOCUMENTS

| | | |
|---|---|---|
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |
| WO | 2008095010 A1 | 8/2008 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |

OTHER PUBLICATIONS

Non-Publihsed Commonly Owned International Patent Application PCT/US2018/057181, filed Oct. 23, 2018, 25 pages, Nicira, Inc.

Non-Published Commonly Owned U.S. Appl. No. 15/881,652, filed Jan. 26, 2018, 42 pages, Nicira, Inc.

Author Unknown, "Datagram," Jun. 22, 2012, 2 pages, retrieved from https://web.archive.org/web/20120622031055/https://en.wikipedia.org/wiki/datagram.

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, CISCO.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. 61/514,990), filed Aug. 4, 2011.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et at, "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Kumar, S., et al., "Service Function Chaining Use Cases in Data Centers" draft-ietf-sfc-dc-use-cases-01, Jul. 21, 2014, 23 pages, IETF.

Liu, W., et al., "Service Function Chanining (SFC) Use Cases," draft-liu-sfc-use-cases-02, Feb. 13, 2014, 17 pages, IETF.

Non-Published Commonly Owned U.S. Appl. No. 16/005,628, filed Jun. 11, 2018, 44 pages, Nicira, Inc.

Non-Published Commonly Owned U.S. Appl. No. 16/005,636, filed Jun. 11, 2018, 45 pages, Nicira, Inc.

Non-Published Commonly Owned U.S. Appl. No. 16/427,294, filed May 30, 2019, 73 pages, Nicira, Inc.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Was, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Non-Published Commonly Owned U.S. Appl. No. 16/816,067, filed Mar. 11, 2020, 55 pages, Nicira, Inc.

* cited by examiner

SPECIFYING AND UTILIZING PATHS THROUGH A NETWORK

BACKGROUND

Traffic engineering refers to a process by which a network administrative program defines specific paths through the network for a series of data message flows. The approaches used to date include MPLS (multiprotocol label switching) techniques that add path descriptive information between layers 2 and 3 headers. Because of this location of the path description, MPLS is commonly referred to as a layer 2.5 protocol. The MPLS techniques, and other previous traffic engineering techniques, however do not readily support encapsulating tenant identifiers. Tying these prior solutions to a tenant will require other policies and multiple encapsulations for the overlay and underlay.

BRIEF SUMMARY

For a multi-tenant environment, some embodiments of the invention provide a novel method for (1) embedding a specific path for a tenant's data message flow through a network in tunnel headers encapsulating the data message flow, and then (2) using the embedded path information to direct the data message flow through the network. In some embodiments, the encapsulating tunnel header is placed before (i.e., outside of) the layers 2-4 header of each data message in the flow.

In some embodiments, the method selects the specific path from two or more viable such paths through the network for the data message flow. To select the path from the set of viable paths between the source and destination of the data message flow, the method in some embodiments performs a classification operation on a data message flow. The classification operation in some embodiments can be based on the data message flow's layer 2-4 header values (e.g., five tuple identifier, i.e., protocol, source and destination ports, and source and destination IP addresses) and/or its associated contextual attributes, such as its traffic type (i.e., the type of content carried in the data message flow), QoS (Quality of Service) ratings, layer 7 parameters, process identifiers, user identifiers, group identifiers, etc.

In some of these embodiments, the contextual attributes are captured from the source machine (e.g., virtual machine, container, etc.) of the data message flow, and/or are captured on a host computer on which this source machine executes. When the set of contextual attributes include the flow's traffic type, the method provides a novel way for selecting a traffic-engineered path for a data message flow, embedding information about this path in the tunnel headers of the data message flow, and using this information to direct the data message flow through a network.

After selecting the path for the data message flow, the method in some embodiments embeds the identified path in tunnel headers that it uses to encapsulate the flow's data messages. Also, in some embodiments, the method embeds in the tunnel headers a tenant identifier (e.g., embeds a VNI, virtual network identifier) to specify that the data messages are associated with a particular tenant (e.g., are emanating from a machine of the particular tenant). The method sends the encapsulated messages along a tunnel to a first intervening forwarding element that serves as the first hop along the selected path.

Some embodiments use Generic Network Virtualization Encapsulation (Geneve) tunneling protocol, to carry the path information (e.g., the next hop index and the list of hops) and the tenant identifier. In some embodiments, the tenant identifier is embedded in the Geneve base header, while the path information is embedded in an option TLV (type, length, value) of the Geneve tunnel header. The embedding of the tenant identifier allows data message flows of multiple tenants to use the same tunnel between two hops.

The method in some embodiments identifies the selected path, and embeds this path in the tunnel header, by identifying and embedding a list of network addresses (e.g., destination IP addresses) for the hops (e.g., intervening forwarding elements) along the path. Also, the method in some embodiments embeds a hop index value in the tunnel header that identifies one of the embedded network addresses as the network address of the "next" hop that is used to identify the next hop along the path. As further described below, each hop along the path decrements the hop index value as the hops along the path are embedded in the tunnel header in a reverse order (with the first hop appearing last in the list of hops and the last hop appearing first on the list of hops).

In some embodiments, the hops along the selected path connect to each other through a set of tunnels. Some or all of the hops in some embodiments are software forwarding elements (e.g., software switches or routers) executing on host computers. In some embodiments, one or more of the hops are hardware forwarding elements, such as top-of-rack switches, hardware routers, etc.

Accordingly, after selecting the path for a data message and encapsulating the data message with a tunnel header that contains the network addresses of the hops along the path, the method in some embodiments passes the encapsulated data message along a tunnel to the first hop (e.g., first SFE) along the path after forwarding element connected to the source machine (e.g., after the software forwarding element executing on the same host computer with the source machine).

For each tunnel that connects two hops along the path, the encapsulating tunnel header of each message in some embodiments includes an outer header that includes source and destination network addresses. In some embodiments, the source address of the outer header being the network address (e.g., IP address) of the hop that sends the message along the tunnel and the destination address being the network address of the hop that receives the message along the tunnel. At each particular hop after the source machine's forwarding element, the particular hop inspects information embedded in the tunnel header to determine that the tunnel header identifies it as the next hop. The particular hop makes this determination in some embodiments by extracting the next hop index from the tunnel header of the received message, using this index to retrieve the network address of the next hop, and then determining that this network address is its address.

After determining that the received data message identifies it as the next hop, the particular hop determines whether it is specified as the last hop of the specified path. If so, the particular hop examines the destination network address embedded in the data message's header. This destination network address (e.g., IP address) specifies a machine (e.g., standalone computer, virtual machine or container) connected to the hop. Accordingly, the particular hop provides the decapsulated data message to this machine.

On the other hand, when the particular hop determines that it is not specified as the last hop along the path that was embedded in the tunnel header of the received data message, the particular hop forwards the encapsulated data message along another tunnel to another hop after adjusting the tunnel header parameters. Specifically, to forward the data message to the other hop, the particular hop in some embodiments (1) decrements the next hop index (extracted from the received data message's tunnel header) to identify the network address of the other hop as the network address of the next hop along the path, (2) resolves the next hop's network address to an underlay tunnel that starts at the particular hop and terminates at the next hop, and (3) embeds this decremented hop index value in the tunnel header along with the tenant identifier and the list of network addresses of the hops along the path. In some embodiments, the particular hop embeds in the outer portion of the tunnel header of the data message the network address of the particular hop as the source network address, and the network address of the other hop as the destination network address, of the encapsulated data message.

Instead of adjusting the tunnel header parameters, the particular hop in other embodiments decapsulates (i.e., removes) the tunnel header from the received data message, and re-encapsulates the data message with a new tunnel header. One of ordinary skill will realize that the above-described approach for processing the embedded path information is only one way for processing such information. Other embodiments process this information differently. For instance, other embodiments do not store a next hop index in the tunnel headers, as each intervening hop is configured to select the next hop address (e.g., the first hop address) and to remove its network address from the list of path-hop network addresses embedded in the tunnel before passing the encapsulated data message to the next hop along the path. Also, the above-described methodology is used in some embodiments to embed selected paths in single tenant environments. Thus, one of ordinary skill will realize that some embodiments of the invention are equally applicable to single tenant datacenters.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
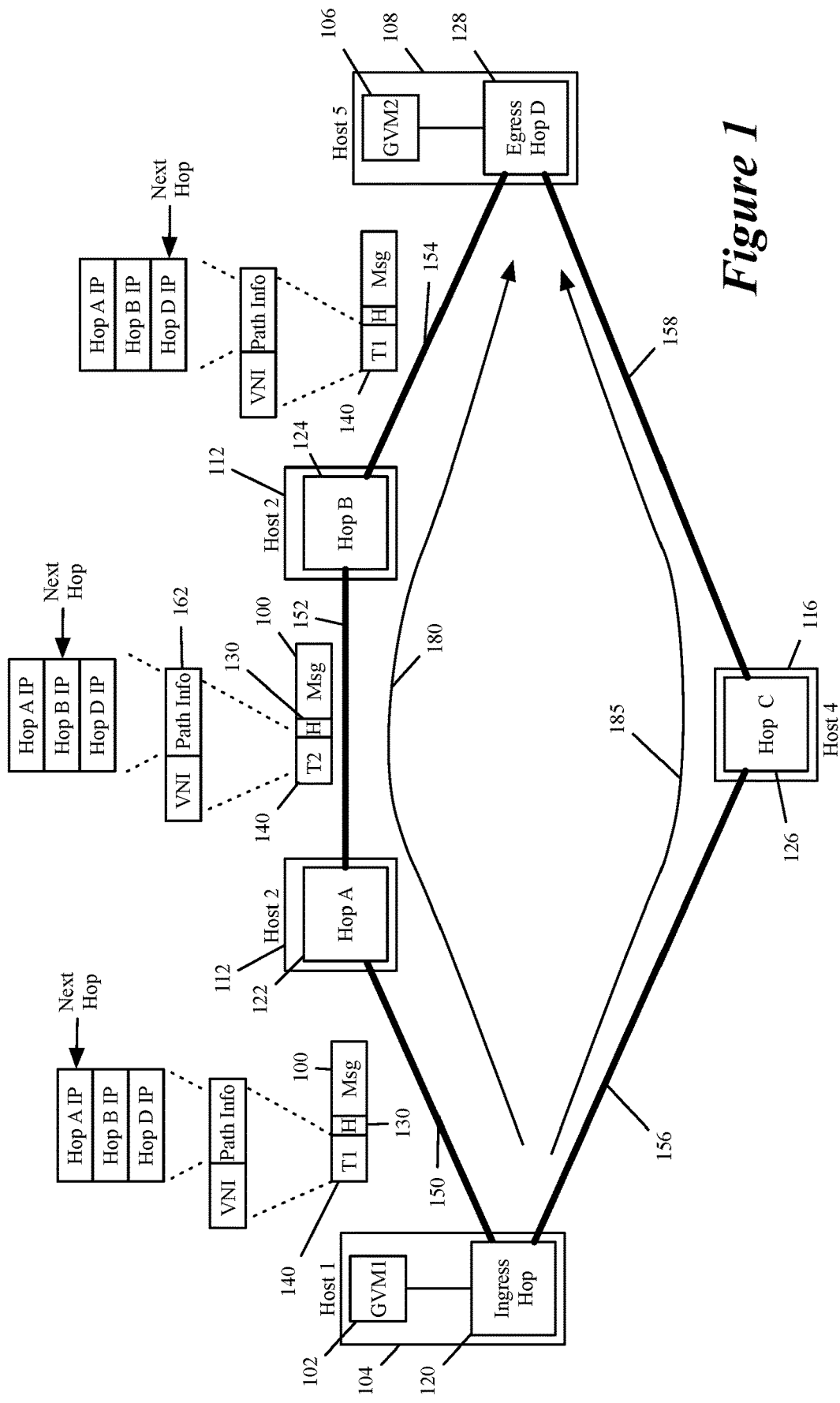
FIG. 1 illustrates an example of specifying and using a specifically defined path according to some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a multi-tenant environment, some embodiments of the invention provide a novel method for (1) embedding a specific path for a tenant's data message flow through a network in tunnel headers encapsulating the data message flow, and then (2) using the embedded path information to direct the data message flow through the network. In some embodiments, the encapsulating tunnel header is placed before (i.e., outside of) the layers 2-4 header of each data message in the flow.

In some embodiments, the method selects the specific path from two or more viable such paths through the network for the data message flow. To select the path from the set of viable paths between the source and destination of the data message flow, the method in some embodiments performs a classification operation on a data message flow. The classification operation in some embodiments can be based on the data message flow's layer 2-4 header values (e.g., five tuple identifier, i.e., protocol, source and destination ports, and source and destination IP addresses) and/or its associated contextual attributes, such as its traffic type (i.e., the type of content carried in the data message flow), QoS ratings, layer 7 parameters, process identifiers, user identifiers, group identifiers, etc. When the set of contextual attributes include the flow's traffic type, the method provides a novel way for selecting a traffic-engineered path for a data message flow, embedding information about this path in the tunnel headers of the data message flow, and using this information to direct the data message flow through a network.

After selecting the path for the data message flow, the method in some embodiments embeds the identified path in tunnel headers that it uses to encapsulate the flow's data messages. Also, in some embodiments, the method embeds in the tunnel headers a tenant identifier (e.g., embeds a VNI, virtual network identifier) to specify that the data messages are associated with a particular tenant (e.g., are emanating from a machine of the particular tenant). The method sends the encapsulated messages along a tunnel to a first intervening forwarding element that serves as the first hop along the selected path.

The method in some embodiments identifies the selected path, and embeds this path in the tunnel header, by identifying and embedding a list of network addresses (e.g., destination IP addresses) for the hops (e.g., intervening forwarding elements) along the path. Also, the method in some embodiments embeds a hop index value in the tunnel header that identifies one of the embedded network addresses as the network address of the "next" hop that is used to identify the next hop along the path. As further described below, each hop along the path decrements the hop index value as the hops along the path are embedded in the tunnel header in a reverse order (with the first hop appearing last in the list of hops and the last hop appearing first on the list of hops).

In some embodiments, the hops along the selected path are connected to each other through a set of tunnels. Some or all of the hops in some embodiments include software forwarding elements (SFEs) executing on host computers. Examples of such SFEs include software routers and switches in some embodiments. In some embodiments, one or more of the hops are hardware forwarding elements, such as top-of-rack switches, hardware routers, etc.

After selecting the path for a data message and encapsulating the data message with a tunnel header that contains the network addresses of the hops along the path, the method in some embodiments passes the encapsulated data message along a tunnel to the first hop (e.g., first SFE) along the path after forwarding element connected to the source machine (e.g., after the software forwarding element executing on the same host computer with the source machine). The outer portion of the tunnel header includes source and destination network addresses. At the ingress hop, the source address of the outer portion is the network address (e.g., IP address) of the ingress hop (or a virtual tunnel endpoint (VTEP) used by this hop) that initially sends the message along the tunnel and the destination address is the network address of the first hop (or its VTEP) that receives the message along the tunnel.

As used in this document, data messages refer to a collection of bits in a particular format sent across a network. One of ordinary skill in the art will recognize that the term data message is used in this document to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates an example of specifying and using a traffic-engineered path according to some embodiments of the invention. In this example, two paths 180 and 185 are specifically specified in a network between two guest virtual machines (GVMs) 102 and 106 executing on two hosts 104 and 108 in a multi-tenant datacenter. The GVMs belong to a tenant that is associated in the datacenter with a particular virtual network identifier VNI. Even though in the example illustrated in FIG. 1 the embedded path information allows the data message flow to take a particular path through one datacenter, one of ordinary skill will realize that in other embodiments this path information is used to specify a path between machines in two or more datacenters of the same enterprise, of the same public cloud provider, and/or of different public cloud providers. Similarly, in some embodiments, this path information can be used to specify a path between machines residing in one or more private datacenters or branch offices and one or more public cloud datacenters.

Each path 180 or 185 starts at an ingress SFE (e.g., software switch or router) 120 executing on the host 104, and terminates at an egress SFE 128 executing on the host 108. These SFEs 120 and 128 serve as the ingress and egress hops for each path. Each path also has one or more intervening hops, with path 180 having intervening hops 122 and 124, and the path 185 having intervening hop 126. Each path is formed by a series of tunnels 150-158 that are established between neighboring hops along the path. In this example, each hop includes a software forwarding element executing on a host computer, although this does not have to be the case. For instance, in some embodiments, one or more of the intervening hops can be top-of-rack switches, spine switches, hardware routers or any other kind of forwarding element.

In the example illustrated in FIG. 1, the path 180 is selected for a data message flow from the GVM 102 to the GVM 106. As shown, the ingress and intervening hops pass the data message along the path through the tunnels 150, 152, and 154 with an encapsulating tunnel header 140 that is placed before (i.e., outside of) the layers 2-4 header 130 of the data message 100. Also, as the encapsulated data message is sent along each tunnel, the tunnel header's outer portion (not shown) identifies the IP addresses of the source and destination endpoints of the tunnel as the source and destination IP addresses of the encapsulated data message.

In some embodiments, the source and destination tunnel endpoints are VTEPs associated with the two hop endpoints of the tunnel. For example, for the tunnel 150, the outer portion of the tunnel header 140 identifies the IP addresses of a VTEP of the ingress hop 120 as the encapsulated data message's source IP address, while identifying the IP addresses of a VTEP of the hop 122 as the encapsulated data message's destination IP address. In the encapsulated data message forwarded by the ingress hop 120 or either intervening hop 122 or 124, the tunnel header 140 includes the tenant's VNI and a path description that specifies the remaining portion of the path at that hop. As shown, the path description in some embodiments is expressed in terms of a list of IP addresses of the remaining hops.

In some embodiments, the ingress hop 120 includes the SFE that receives the data message from the source GVM 102, and a path processing filter that executes on the same host computer 104. As further described below, a hook (e.g., a callback function) is defined in a port of the SFE to intercept the data message sent by the source GVM 102 and to forward the data message to the path-processing filter. This filter then performs a classification operation on the data message, in order to select the path 180 for the data message to its destination GVM 106.

This classification operation selects the path 180 from the group of two candidate paths 180 and 185 that are viable candidate paths that have been specifically defined (e.g., by a controller or a forwarding element) to reach the destination GVM 106. In some embodiments, the classification operation is based on a set of attributes associated with the data message flow. This attribute set in some embodiments just includes the data message flow's layer 2-4 header values. In other embodiments, however, the attribute set includes contextual attributes related to the data message flow, such as the data message flow's traffic type (i.e., the type of content carried in the data message flow), QoS ratings, layer 7 parameters, process identifiers, user identifiers, group identifiers, etc.

When the set of contextual attributes include the flow's traffic type, the ingress hop selects a traffic-engineered path for a data message flow, embeds information about this path in the tunnel headers of the data message flow, and uses this information to direct the data message flow through a network. For instance, based on deep packet inspection performed on host computer 104, a first data message flow between the GVMs 102 and 106 might be identified as carrying video conference data for corporate executives, while a second data message flow between these two GVMs might be identified as carrying chat message data between two non-executives. Based on this contextual data, path 180 is selected for the first message flow as this path might be more optimal for delay or latency, while path 185 is selected for the second message flow as this path might be more optimal for cost.

After selecting the path for the intercepted data message, the ingress hop's path-processing filter in some embodiments embeds the selected path in the tunnel header 140 that it uses to encapsulate the data message 100. As shown, the path-processing filter in some embodiments identifies and embeds the selected path in terms of the IP addresses of the intervening hops 122 and 124 and the egress hop 128. In addition to the IP addresses of these hops, the ingress path-processing filter embeds in the tunnel header a tenant identifier (which in this case is the particular tenant's VNI) to specify that the data message 100 is associated with the particular tenant (e.g., are emanating from a GVM of the particular tenant).

The ingress path-processing filter in some embodiments embeds the network addresses of the endpoints of the first tunnel 150 in the outer portion of the tunnel header 140. This path-processing filter in some embodiments also embeds a next hop value in the tunnel header that identifies the embedded network address of the intervening hop 122 as the network address of the "next" hop. As further described below, subsequent hops along the path use this index in some embodiments to identify the next hop along the path.

After selecting the path for the data message 100 and encapsulating the data message with the tunnel header 140, the ingress hop 120 passes the encapsulated data message along the tunnel 150 to the intervening hop 122. As mentioned above, the outer portion of the tunnel header 140 in some embodiments identifies the IP addresses of a VTEP of the ingress hop 120 as the encapsulated data message's source IP address, while identifying the IP addresses of a VTEP of the first hop 122 as the encapsulated data message's destination IP address.

At each subsequent hop 122, 124 or 128 along the path 180, the hop inspects the tunnel header and determines that the received data message is addressed to it. Each particular hop makes this determination in some embodiments by extracting the hop index from the tunnel, using this index to retrieve the network address of the next hop from the tunnel header, and then determining that address is its network address. After determining that the received data message identifies it as the next hop, the particular hop determines whether it is specified as the last hop of the specified path.

If not, the particular hop forwards the encapsulated data message along another tunnel to another hop after adjusting the tunnel header parameters. Specifically, to forward the data message to the other hop, the particular hop in some embodiments (1) decrements the next hop index (extracted from the received data message's tunnel header) to identify the network address of the other hop as the network address of the next hop along the path, (2) resolves the next hop's network address to an underlay tunnel that starts at the particular hop and terminates at the next hop, and (3) embeds this decremented hop index value in the tunnel header along with the tenant identifier and the list of network addresses of the hops along the path.

FIG. 1 illustrates the adjustment to the next hop index by showing this index as (1) initially referencing the IP address of hop 122 when the encapsulated data message leaves the ingress hop, (2) referencing the IP address of hop 124 when the encapsulated data message leaves the hop 122, and (3) referencing the IP address of hop 128 when the encapsulated data message leave the hop 124. Each particular hop also adjusts the outer portion of the tunnel header so that the network address of the particular hop is the source network address, and the network address of the subsequent hop along the path 180 is the destination network address, of the encapsulated data message. For example, the hop 122 places its IP address as the source IP address of the outer header, and the IP address of hop 124 as the destination IP address in this header. Similarly, the hop 124 places its IP address as the source IP address of the outer header, and the IP address of egress hop 128 as the destination IP address in this header.

Instead of adjusting the tunnel header parameters, the particular hop in other embodiments decapsulates (i.e., removes) the tunnel header from the received data message, and re-encapsulates the data message with a new tunnel header. Also, other embodiments do not store a next hop index in the tunnel headers, as in these embodiments, each intervening hop is configured to select the next hop address (e.g., the first hop address) and to remove its network address from the list of path-hop network addresses embedded in the tunnel before passing the encapsulated data message to the next hop along the path.

When the encapsulated data message reaches the egress hop 128, this hop determines that it is specified as the last hop along the path that is embedded in the tunnel header of the data message (e.g., determines that the next hop index is its smallest value and it identifies this hop's address). Hence, it removes the tunnel header and examines the destination network address embedded in the data message's header 130. This destination network address (e.g., IP address) is the IP address of GVM 106 connected to it. Accordingly, egress hop provides the decapsulated data message to this machine.

In FIG. 1, the egress hop communicatively connects to the destination machine of the data message without having to go through intervening routing/switching fabric. In other examples, the egress hop connects to the message's destination (e.g., destination computer, virtual machine or container) through an intervening fabric (i.e., through intervening routers/switches). In these cases, the egress hop forwards the data message through the intervening fabric.

Some embodiments use Generic Network Virtualization Encapsulation (Geneve) tunneling protocol, to carry the path information (e.g., the next hop index and the list of hops along the path) and the tenant identifier. In some embodiments, the path information is embedded in a Geneve option TLV (type, length, value) that is examined by the hops along the path in order to identify the next hop, if any.

Figure 2:
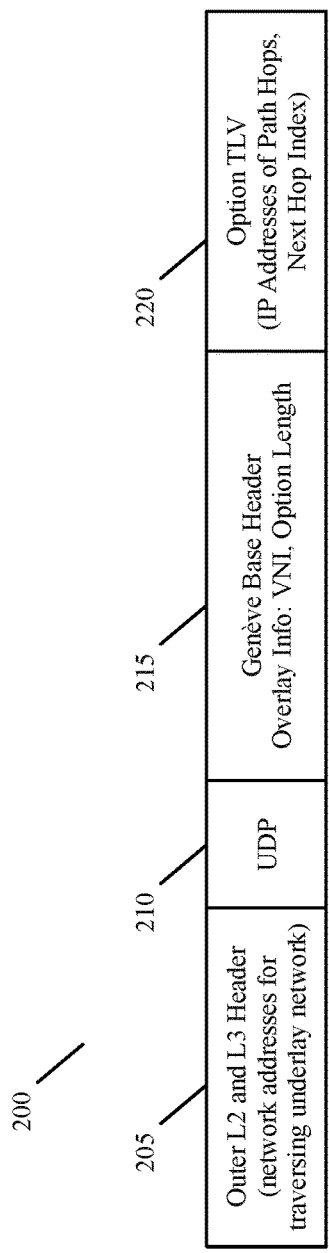
FIG. 2 illustrates a Geneve tunnel header of some embodiments.

FIG. 2 illustrates the Geneve tunnel header 200 used in some embodiments. In some embodiments, this tunnel header 200 is a standard Geneve tunnel header that has an option TLV to store the path information and next hop index. Specifically, as shown, this tunnel header includes an outer header 205, a protocol field 210, a Geneve base header 215, and an option TLV 220. As described above, the outer portion 205 of the tunnel header 200 includes the network addresses (e.g., source and destination IP addresses of the two endpoints of the tunnel, with the source and destination designation depending on the direction of the message flow) in the underlay network that allow the encapsulated data message to traverse the underlay network and reach the tunnel destination endpoint. The protocol field 210 specifies a UDP protocol as well as attributes associated with this protocol.

Figure 3:
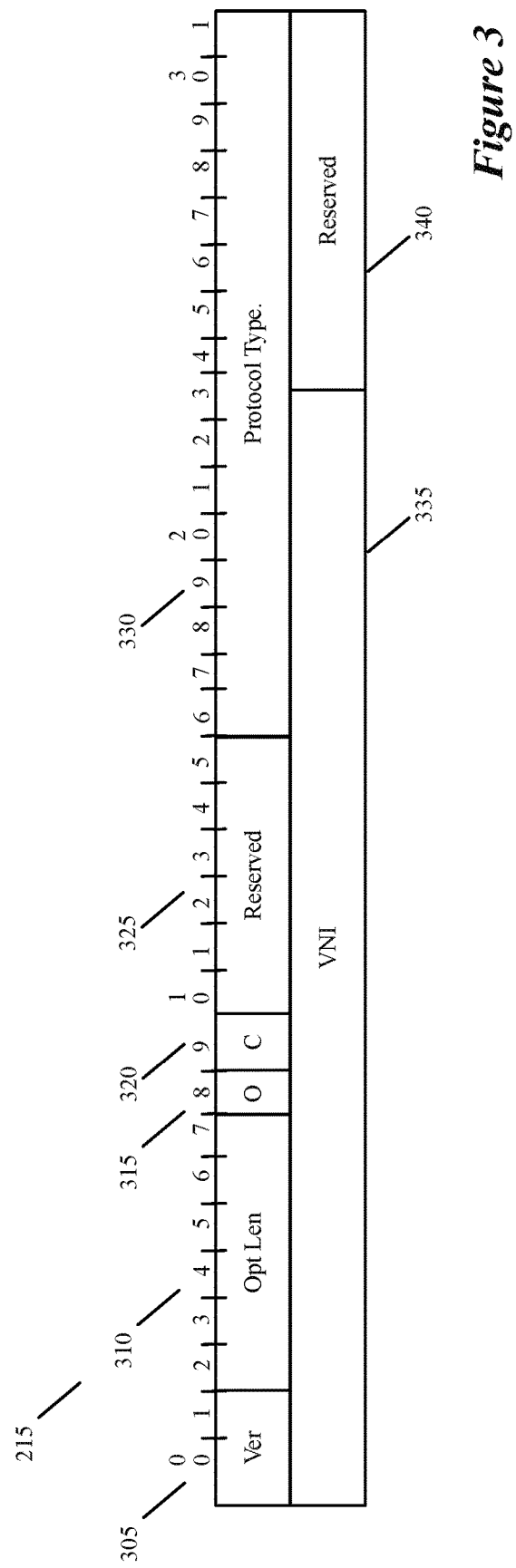
FIG. 3 illustrates a Geneve base header of some embodiments.

FIG. 3 illustrates the Geneve base header 215 of some embodiments. As shown, this header in some embodiments is 64-bit wide and stores several tunnel parameters, including the tenant identifier and the option length. Its version field 305 is a 2-bit value that specifies the current Geneve tunnel version being used. Tunnel endpoints that receive messages with unknown versions drop the messages. Non-terminating devices processing Geneve packets with an unknown version number treat them as UDP packets with an unknown payload.

The option length field 310 specifies the length of the options fields, expressed in four byte multiples, not including the eight byte fixed tunnel header. This results in a minimum total Geneve header size of 8 bytes and a maximum of 260 bytes. The start of the payload headers can be found using this offset from the end of the base Geneve header. The O bit 315 specifies whether the data message is an OAM frame that contains a control message instead of a data payload. Endpoints do not forward the payload of this message and transit devices do not attempt to interpret or process it. Since control messages are not frequent, the endpoints typically direct these messages to a high priority control queue. The transit devices do not alter forwarding behavior on the basis of this bit, such as ECMP link selection.

The C bit 320 is a critical option field that when set, indicates that the options are present. One or more options can have the critical bit set. If this bit is set then tunnel endpoints parses the options list to interpret any critical options. When this bit is set, endpoints must drop the encapsulated message if they do not recognize this option. On devices where option parsing is not supported, the frame is dropped on the basis of the "C" bit in the base header. If the bit is not set tunnel endpoints may strip all options using "Opt Len" and forward the decapsulated frame. Transit devices do not drop or modify packets on the basis of this bit.

The first set of reserved bits 325 are 6 bits that must be zero on transmission and ignored on receipt. The protocol type bits 330 are 16 bits that express the type of the protocol data unit appearing after the Geneve header. The VNI bits 335 express a 24-bit identifier for a unique element of a virtual network. In many situations, this may represent an L2 segment, however, the control plane defines the forwarding semantics of decapsulated packets. The VNI may be used as part of ECMP forwarding decisions or may be used as a mechanism to distinguish between overlapping address spaces contained in the encapsulated packet when load balancing across CPUs. The second set of reserved bits 340 are 8 bits that must be zero on transmission and ignored on receipt.

The Geneve base header is followed by the option TLV 220. This TLV includes a four-byte option header and a variable amount of option data interpreted according to the option type. The option data in some embodiments includes the IP addresses of the hops along the path plus a next hop index that identifies one of these IP addresses as the IP address of the next hop along the path.

Figure 4:
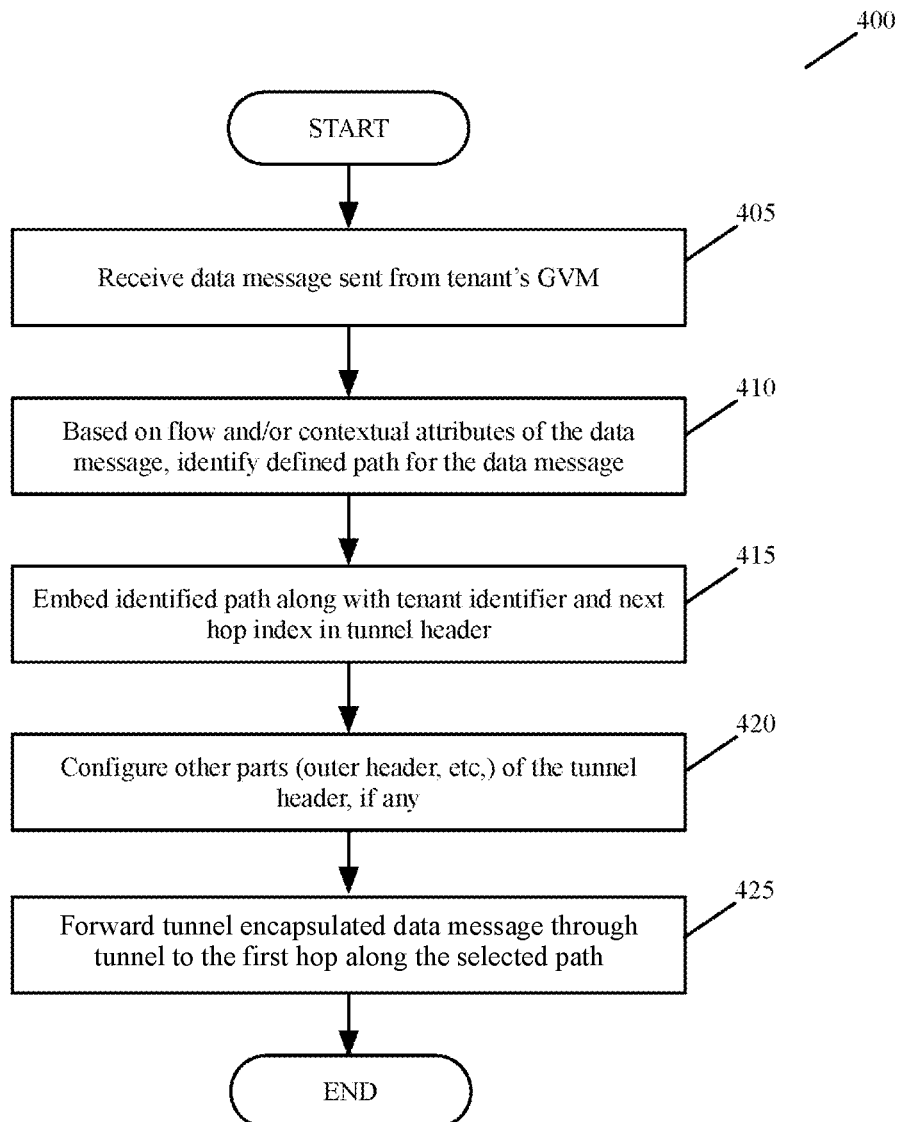
FIG. 4 conceptually illustrates a process performed by an ingress hop in some embodiments.

FIG. 4 conceptually illustrates a process 400 performed by an ingress hop (like hop 120) of some embodiments. This process selects a path for a data message sent by a tenant GVM on a host computer, and then embeds a path hop list, which defines this path, in a Geneve tunnel header that it uses to encapsulate the data message, before sending this encapsulated message along a tunnel to the first hop along the selected path. In some embodiments, the ingress hop includes an SFE (e.g., software switch) and a path processing filter that execute on the host computer (e.g., computer 104) along with the tenant GVM (e.g., GVM 102) that sends the data message. In some embodiments, the GVMs on the host computer communicatively connect with the SFE, which forwards data messages to and from the GVMs.

As shown, the process 400 initially receives (at 405) a data message from the tenant GVM (e.g., GVM 102) executing on its host (e.g., 104). In some embodiments, the process 400 receives this data message from a callback function that is defined in the port of the SFE or VNIC of the GVM. This callback function intercepts data messages sent by the GVM and forwards the data messages to the path-processing filter.

Based on a set of attributes associated with the data message, the process (e.g., the path-processing filter) performs (at 410) a classification operation on the data message, in order to select a defined path through the network to the data message's destination. For at least some of the data messages, this classification operation selects the path from a group of two or more candidate paths that are viable candidate paths that have been specifically defined (e.g., by a controller or a forwarding element) to reach the destination of the data message.

In some embodiments, the classification operation is based on a set of attributes associated with the data message. This attribute set in some embodiments just includes the data message's layer 2-4 header values. In other embodiments, however, the attribute set includes contextual attributes related to the data message, such as the data message's traffic type (i.e., the type of content carried in the data message's flow), QoS ratings, layer 7 parameters, process identifiers, user identifiers, group identifiers, etc. When the set of contextual attributes include the data message's traffic type, the process selects (at 410) a path that is defined for the data message's flow based on the traffic that is carried in this message flow. In some embodiments, the process 400 uses a deep packet inspector on host computer 104 to perform a deep packet inspection of the data message or its flow in order to identify the type of traffic carried in the data message or its flow.

Based on the data message's attributes, the process selects a path for the data message in some embodiments that is optimal from a perspective of one or more metrics, such as cost, delay, latency, loss etc. In some embodiments, the process performs the classification operation (at 410) by comparing one or more attributes of the data message (e.g., the data message's 5-tuple identifier and/or associated contextual attributes) with identifiers of several path-defining rules stored in a rule storage. Each rule specifies a path through a network, which in some embodiments are specified as IP addresses of hops along the path. Hence, after matching the data message's attributes to a set of identifiers of a rule, the process selects the path specified by the rule as the path for the data message.

It should be noted that the process 400 allows two different tenants of a multi-tenant network to optimize their traffic-engineered paths different. For instance, for two data message flows of two tenants that carry the same type of traffic (i.e., the same type of payload content) between the same source and destination computers (on which at least one source or destination machine of each tenant executes), the process 400 can select two different paths. This can occur because one tenant might wish to use a faster, lower-latency path for that type of content, while the other tenant might wish for a less expensive path for that type of content. To implement this, some embodiments define different path-selection rules for different tenants, while other embodiments use the tenant identifier as one of the attributes for performing the path-selection classification operation.

After identifying (at 410) the path for the data message, the process 400 embeds (at 415) the identified path in an option TLV 220 of a Geneve tunnel header 200 that it will use to encapsulate the received data message. As described above, the option TLV stores the path in terms of the IP addresses of the hops along the path. Also, as further described above, the option TLV stores these IP addresses in reverse order, with the first hop's address appearing last in the list while the last hop's address appears first in the list.

In the option TLV, the process also stores (at 415) the next hop value. The process sets this value to identify the last network address in the path hop list, which is the address of the first hop. The next hop index value is used to identify the embedded network address of the "next" hop, and subsequent hops use this index in some embodiments to identify the next hop along the path. At 415, the process 400 also embeds in the base header 215 of the Geneve tunnel header the VNI of the tenant associated with the source GVM that sent the received data message. The embedding of the VNI allows the same set of tunnels to be used to forward data messages for different tenants.

Next, at 420, the process configures other parts of the Geneve tunnel header. For instance, the process stores in the outer portion header 205 of the tunnel header 200 the L2 and L3 network addresses of its VTEP (e.g., a VTEP associated with its SFE) and the VTEP of the first hop as the source and destination network addresses. At 420, the process defines the UDP protocol in the Geneve tunnel header, and sets any other fields that need to be define, per the discussion above and the tunnel deployment configuration being used.

After finalizing the tunnel header configuration (at 420), the process passes (at 425) the encapsulated data message along a Geneve tunnel to the first hop (e.g., hop 122) along the selected path. To send this data message, the process in some embodiments resolves the IP address of the first hop to the tunnel that connects the ingress hop to the first hop. After 420, the process ends.

Figure 5:
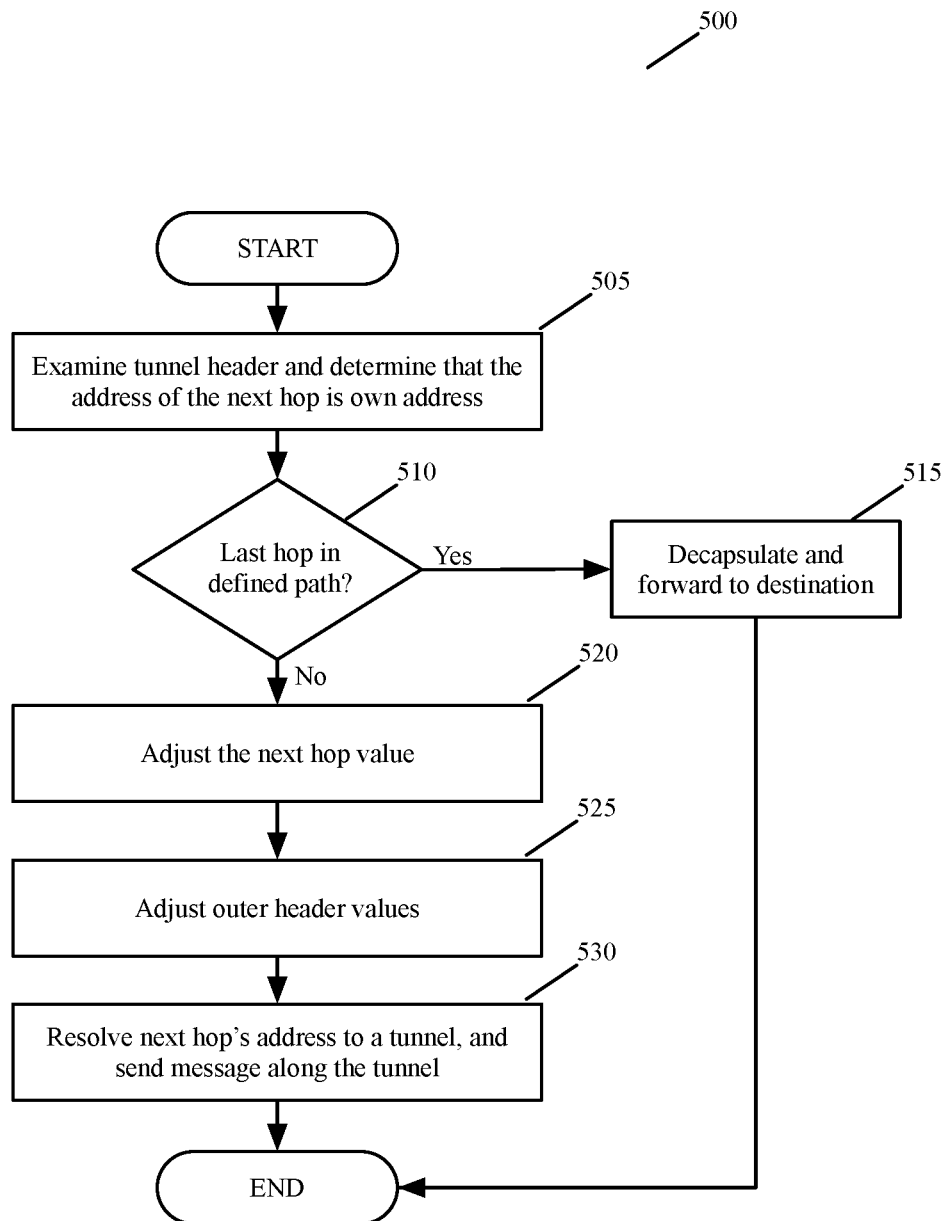
FIG. 5 illustrates a process that a hop along a path performs when it receives a Geneve-encapsulated data message.

FIG. 5 illustrates a process 500 that a hop performs when it receives a Geneve-encapsulated data message. In some embodiments, this hop executes on a host computer along with one or more tenant machines (e.g., GVMs). As shown, the process inspects (at 505) the tunnel header and determines that the received data message is addressed to it. The hop makes this determination in some embodiments by extracting the next hop index from the tunnel, using this index to retrieve the network address of the next hop along the path, and then determining that this address is the IP address of its own.

Once the process 500 determines (at 505) that the received data message is addressed to it, the process determines whether it is the last hop in the path embedded in the tunnel header. In some embodiments, this would be the case when the next hop index is at is lowest value (e.g., it is 0 or 1, depending on which is defined as the lowest value), which is indicative that the last hop has been reached. When the process 500 determines (at 510) that it is the last hop in the embedded path, it removes the tunnel header (i.e., decapsulates the encapsulated tunnel header), and forwards the data message to the destination machine identified by the destination network address identified in the received data message's original header (e.g., header 130).

In some embodiments, the process 500 is performed by a path-processing filter that executes on the same host computer as the destination machine. A port of a SFE executing on the host computer in some embodiments passes the encapsulated data message to the path-processing filter. In these embodiments, the path-processing filter passes the decapsulated data message back to the SFE port (e.g., passes a handle to this message to this part) and the SFE port processes, or has the SFE process, this message so that it can be forwarded to the destination machine (e.g., the destination GVM or container) executing on the same host computer. In some embodiments, the egress hop connects to the data message's destination (e.g., destination computer, virtual machine or container) through an intervening fabric (i.e., through intervening routers/switches). In these cases, the egress hop forwards the data message through the intervening fabric to the data message's destination.

When the process 500 determines (at 510) that it is not the last hop in the embedded path, the process adjusts (at 520) the next hop index value in the tunnel header of the received encapsulated message, in order to identify the next hop in the path identified by the embedded path information. As mentioned above, the process adjusts the next hop index value in some embodiments by decrementing this value as the path is specified in the tunnel header by a reverse ordered list of hop IP addresses.

Next, at 525, the process adjusts the outer header values of the tunnel header to identify its own IP address as the source IP address of the encapsulated message, and the IP address of the next hop (now identified by the adjusted next hop index value) as the destination IP address of the encapsulated message. At 530, the process resolves the next hop's address to a tunnel between the current hop and the next hop, and sends the encapsulated data message along this tunnel to the next hop. Before sending the encapsulated data message along the resolved tunnel, the process 500 in some embodiments adjusts (at 530) one or more parameters in the data message's tunnel header (e.g., option, ID or other attributes of the next tunnel) to reflect new attributes and/or identity of the new tunnel along which the data message will get sent. After 530, the process ends.

Figure 6:
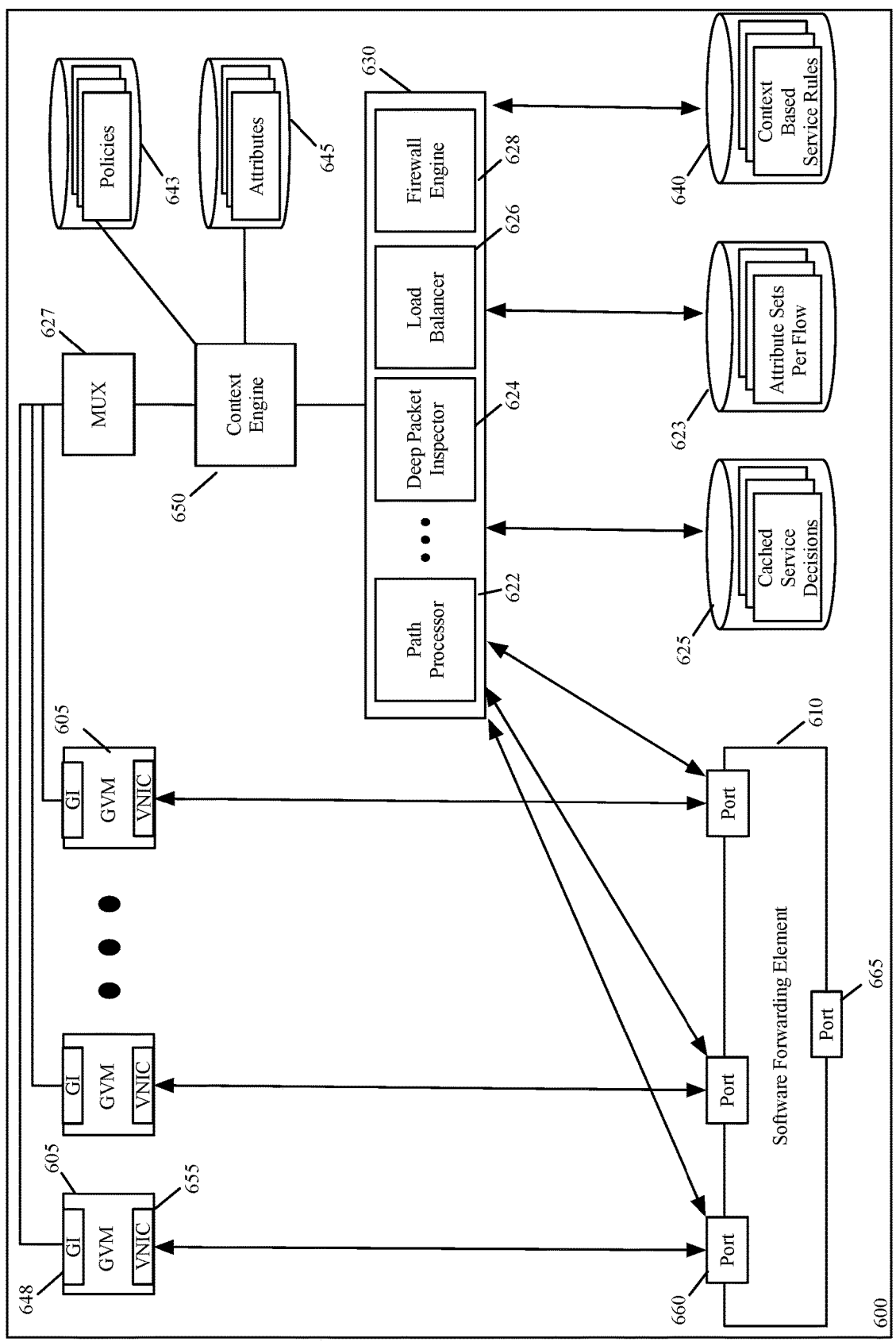
FIG. 6 illustrates a host computer that is used in some embodiments to execute the virtual machines, service machines and path processors of some embodiments.

FIG. 6 illustrates a host computer 600 that is used in some embodiments to execute the GVMs, hop-processing forwarding element and path-processing filter of some embodiments. This host computer also executes service engines that perform context-rich, attribute-based services in a datacenter. The host computer 600 includes several GVM 605, a software forwarding element 610, a context engine 650, service engines 630, context-based service rule storage 640, context-attribute storage 645, an attribute-mapping storage 623, a connection state cache storage 625, a MUX (multiplexer) 627, and a context-engine policy storage 643. The service engines 630 include a path processor 622, a deep packet inspector 624, a load balancer 626, a firewall engine 628, and one or more other service engines (not shown).

In FIG. 6, the GVMs 605 execute on a hypervisor. In some embodiments, the context engine 650, the software forwarding element 610, the service engines 630, the context-based service rule storages 640, the connection state cache storage 625, the context-engine policy storage 643, and the MUX 627 operate in the kernel space of the hypervisor, while the VMs 605 operate in the hypervisor's user space. In other embodiments, one or more service engines and/or the context engine are user space modules (e.g., are service VMs).

In some embodiments, the GVMs 605 are tenant machines that serve as data end points for some or all tenant data message flows in the datacenter. Examples of such machines include webservers, application servers, database servers, etc. In some cases, all the VMs belong to one entity, e.g., an enterprise that operates the host. In other cases, the host 600 operates in a multi-tenant environment (e.g., in a multi-tenant data center), and different VMs 605 may belong to one tenant or to multiple tenants.

Each VM 605 includes a GI agent 648 that communicates with the context engine 650 to provide context attribute sets to this engine, and to receive instructions and queries from this engine. The communications between the context engine 650 and the GI agents 648 are relayed through the MUX 627. One example of such a mux is the mux that is used by the Endpoint Security (EPSec) platform of ESX hypervisors of VMware, Inc. In some embodiments, the attributes collected by the context engine 650 from the GI agents 650 include a rich group of parameters (e.g., layer 7 parameters, process identifiers, user identifiers, group identifiers, etc.). U.S. patent application Ser. No. 15/650,251, filed Jul. 14, 2017, now published as U.S. Patent Application Publication 2018/0181423, further describes the capturing and use of these contextual attributes through the GI agent 648. The U.S. patent application Ser. No. 15/650,251, now published as U.S. Patent Application Publication 2018/0181423, is incorporated herein by reference.

As shown, each GVM 605 includes a virtual network interface card (VNIC) 655 in some embodiments. Each VNIC is responsible for exchanging messages between its VM and the SFE 610. Each VNIC connects to a particular port 660 of the SFE 610. The SFE 610 also connects to a physical network interface card (NIC) (not shown) of the host. In some embodiments, the VNICs are software abstractions created by the hypervisor of one or more physical NICs (PNICs) of the host.

In some embodiments, the SFE 610 maintains a single port 660 for each VNIC of each VM. The SFE 610 connects to the host PNIC (through a NIC driver (not shown)) to send outgoing messages and to receive incoming messages. In some embodiments, the SFE 610 is defined to include a port 665 that connects to the PNIC's driver to send and receive messages to and from the PNIC. The SFE 610 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 660 or 665, which directs the message to be supplied to a destination VM or to the PNIC).

In some embodiments, the SFE 610 is a software switch, while in other embodiments it is a software router or a combined software switch/router. The SFE 610 in some embodiments implements one or more logical forwarding elements (e.g., logical switches or logical routers) with SFE executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 6 Networks over Layer 3 Networks, IETF.

The ports of the SFE 610 in some embodiments include one or more function calls to one or more modules that implement special input/output (I/O) operations on incoming and outgoing messages that are received at the ports. Examples of I/O operations that are implemented by the ports 660 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 655, port 665, etc.) implement the I/O function call operations instead of, or in conjunction with, the ports 660.

In some embodiments, one or more of function calls of the SFE ports 660 can be to one or more service engines 630 that process service rules on the data message flows sent to and received for the GVMs. Some of these service rules are context-based service rules in the context-based service rule storages 640. Each service engine 630 in some embodiments has its own context-based service rule storage 640, attribute-mapping storage 623, and connection state cache storage 625. FIG. 6 presents just one context-based service rule storage 640, attribute-mapping storage 623, and connection state cache storage 625 for all the service engines in order not to obscure the presentation in this figure with unnecessary detail. Also, in some embodiments, each VM can have its own instance of a service engine (e.g., its own instance of path processor 622, deep packet inspector 624, load balancer 626, and firewall engine 628). In other embodiments, one service engine can service data message flows for multiple VMs on a host (e.g., VMs for the same logical network).

To perform its service operation for a data message flow, a service engine 630 in some embodiments tries to match the flow identifier (e.g., the five-tuple identifier) and/or the flow's associated context attribute set to the rule identifiers of its service rules in its context-based service rule storage 640. Specifically, for a service engine 630 to perform its service check operation for a data message flow, the SFE port 660 that calls the service engine supplies a set of attributes of a message that the port receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

The service engine in some embodiments then uses the received message's attribute set (e.g., the message's five-tuple identifier) to identify the context attribute set that the service engine has stored for this flow in the attribute-mapping storage 623. The context engine 650 in some embodiments supplies the context attributes for new flows (i.e., new network connection events) to the service engines 630, along with a flow identifier (e.g., a five-tuple identifier). The context-engine policy storage 643 contains the rules that control the operation of the context engine 650. In some embodiments, these policies direct the context engine to generate rules for the service engines or to direct the service engines to generate rules. The service engines 630 in these embodiments store the context attributes that they receive from the context engine in the attribute-mapping storage 623.

In some embodiments, a service engine 630 stores the context attribute set for each new flow with that flow's identifier (e.g., five-tuple identifier) in the attribute-mapping storage. In this manner, the service engine can identify the context attribute set for each new flow that it receives from the SFE ports 660 by searching its attribute-mapping storage 623 for a context record that has a matching flow identifier. The context record with the matching flow identifier includes the context attribute set for this flow.

Some or all of the service engines in some embodiments pull the context attribute sets for a new flow from the context engine. For instance, in some embodiments, a service engine supplies a new flow's five-tuple identifier that it receives from the SFE port 660, to the context engine 650. This engine 650 then examines its attribute storage 645 to identify a set of attributes that is stored for this five-tuple identifier, and then supplies this attribute set (or a subset of it that it obtains by filtering the identified attribute set for the service engine) to the service engine.

Some embodiments implement the pull model by using a service token to encode the attribute set for a new message flow. When notified of a new network connection event, the context engine 650 in some embodiments (1) collects the context attribute set for the new event, (2) filters this set to discard the attributes that are not relevant for performing one or more services on the flow, (3) stores the remaining filtering attribute subset in the attribute storage 645 along with a service token, and (4) provides the service token to the GI agent 648. The GI agent 648 then causes this token to be passed to the service engine(s) in-band (e.g., in a header of the data message that the agent's VM sends to a destination) or out-of-band (i.e., separately from the data messages that the agent's VM sends to a destination).

When the service engine gets the new flow through the SFE port 660, it supplies this flow's service token to the context engine, which uses this service token to identify in its attribute storage 645 the context attributes to supply to the service engine. In the embodiments that the SFE port does not provide this service token to the service engine, the service engine first has to identify the service token by searching its data stores using the flow's identifier before supplying the service token to the context engine.

After identifying the contextual attribute set for a data message flow, the service engine 630 in some embodiments performs its service operation based on service rules that are stored in the context-based service rule storage 640. To perform its service operation, the service engine 630 matches the received attribute subset with corresponding attribute sets that are stored for the service rules. In some embodiments, each service rule in the context-based service rule storage 640 has a rule identifier and an action parameter set.

As mentioned above, the rule identifier of a service rule in some embodiments can be defined in terms of one or more contextual attributes that are not L2-L4 header parameters (e.g., are L7 parameters, user identifiers, group identifiers, process name, loaded module identifiers, consumption parameters, etc.). In some embodiments, a rule identifier can also include L2-L4 header parameters. Also, in some embodiments, one or more parameters in a rule identifier can be specified in terms of an individual value or a wildcard value. Also, in some embodiments, a rule identifier can include a set of individual values or a group identifier, such as a security group identifier, a compute construct identifier, a network construct identifier, etc.

To match a received attribute set with the rules, the service engine compares the received attribute set with the associated identifiers of the service rules stored in the context-based service rule storage 640. Upon identifying a matching rule, the service engine 630 performs a service operation (e.g., a path processing operation, a firewall operation, a load balancing operation, an encryption operation, other middle-box operation, etc.), based on the action parameter set (e.g., based on the path hop list, Allow/Drop parameters, the load balancing criteria, encryption parameters, etc.) of the matching rule.

In some embodiments, the context-based service rule storage 640 is defined in a hierarchical manner to ensure that a message rule check will match a higher priority rule before matching a lower priority rule, when the message's attribute subset matches multiple rules. Also, in some embodiments, the context-based service rule storage 640 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the context-based service rule storage 640 based on the message's identified context attribute set, the service engine of some embodiments stores the service rule (or a reference to the service rule) in the connection state cache storage 625, so that it can later use this service rule for subsequent data messages of the same flow.

In some embodiments, the connection state cache storage 625 stores the service rule, or a reference to the service rule, that the service engine 630 identifies for different message identifier sets (e.g., for different five-tuple identifiers that identify different data message flows). In some embodiments, the connection state cache storage 625 stores each service rule, or reference to the service rule, with an identifier (e.g., a flow's five-tuple identifier) that is generated from the matching message identifier set.

Before checking with the context-based service rule storage 640 for a particular message, a service engine 630 of some embodiments checks the connection state cache storage 625 to determine whether this storage has previously identified a service rule for this message's flow. If not, the service engine 630 identifies the contextual attribute set for the message flow, and then checks the context-based service rule storage 640 for a service rule that matches the message's identified attribute set and/or its five-tuple identifier. When the connection state data storage has an entry for the particular message, the service engine performs its service operation (e.g., its path selection operation) based on this service rule's action parameter set (e.g., based on hop list identified by this service rule in the connection cache 625).

At each hop along a path, a hop path processor in some embodiments processes the path information embedded in the data message's tunnel header. On the host computer, the software forwarding element 610 is associated with the VTEP that serves as a Geneve tunnel endpoint in some embodiments. For an ingress hop (e.g., hop 120), the path processor performs the operations of the process 400 of FIG. 4 in some embodiments. For a data message sent by a GVM 605 on its host computer, the path processor 622 selects an engineered path through the network for the data message to its destination based on the data message's attributes.

As mentioned above, these attributes can just include the message's flow identifier (e.g., five tuple identifier) in some cases, just include this message's captured contextual metadata in other cases, or can include both the message's flow identifier and captured contextual metadata. To select a path, the path processor in some embodiments matches the message's flow identifier and/or contextual metadata attributes with the rule identifier attributes of path-specifying rules of the path processor that are stored in the rule storage 640. In some embodiments, each path-specifying rule in the storage 640 specifies a path in terms of a list of IP addresses for the hops along the path.

In some embodiments, the captured context for a data message includes the traffic type for the data message's flow (i.e., the type of content carried in that flow). In some embodiments, the DPI engine 624 identifies this traffic type when an SFE port 660 calls the DPI engine for the data message and/or other data messages in the same flow. The DPI engine in some embodiments provides this traffic type to the context engine 650 to store in the attribute storage 645, so that the context engine 650 can subsequently provide the traffic type to the path processor 622 when this processor asks for this information for the data message (e.g., by providing the message's flow identifier attributes, or service token). In other embodiments, the context engine 650 pushes the traffic type for a flow to the attribute storage 623 (through the path processor 622 or another service engine) so that the path processor can later retrieve the flow's traffic type when processing a data message of the flow.

When the captured contextual attributes include the data message's traffic type, the ingress hop can select between two or more traffic-engineered paths to the data message's destination, when two or more such paths are previously defined and stored in the rule storage 640. For instance, as described above by reference to FIG. 1, path 180 might be more optimal based on delay and/or latency considerations, while path 185 might be more optimal from a cost perspective. Hence, for a first data message flow between the GVMs 102 and 106 that carries video conference data for corporate executives, the path processor matches the data message flow's attributes to a path-specifying rule that identifies path 180 as the flow's path to the GVM 106. On the other hand, for a second data message flow between these two GVMs that carries chat message data between two non-executives, the path processor matches the data message flow's attributes to a path-specifying rule that identifies path 185 as the flow's path to the GVM 106.

After matching the message's attribute set with one of path-specifying rules, the path processor 622 of the ingress node embeds the path hop list of the of path-specifying rule in a Geneve tunnel header, along with other tunnel attributes described above (e.g., outer header parameters, next hop index, etc.). In some embodiments, the path processor 622 has another one of the service engines 630 perform the tunnel encapsulation. After encapsulating the data message with a Geneve tunnel header 200, the path processor returns the data message to the SFE (e.g., provides a handle for the location in memory at which the encapsulated data message is stored) so that the SFE can forward the data message along the Geneve tunnel to the hop associated with the first service machine in the specified path hop list.

When the path processor 622 is performing the operations of a non-ingress hop, the path processor performs the operations of the process 500 of FIG. 5 in some embodiments. For instance, it determines that a tunnel encapsulated data message has a path hop list that identifies the IP address of its SFE VTEP as the address of the next hop.

Once the path processor 622 determines that the received data message is addressed to it, the processor determines whether it is the last hop in the path embedded in the tunnel header. In some embodiments, this would be the case when the next hop index identifies the current hop's address as the first address in the path hop address list (i.e., when the next hop index has its lowest value). When the path processor 622 determines that it is the last hop in the embedded path, it removes the tunnel header (i.e., decapsulates the encapsulated tunnel header), and passes the decapsulated data message back to the SFE port (e.g., passes a handle to this message to this part) and the SFE port processes, or has the SFE process, this message so that it can be forwarded to the destination machine (e.g., the destination GVM or container) executing on the same host computer. In some embodiments, the egress hop connects to the data message's destination (e.g., destination computer, virtual machine or container) through an intervening fabric (i.e., through intervening routers/switches). In these cases, the egress hop forwards the data message through the intervening fabric to the data message's destination.

When the path processor is not the last hop in the embedded path, the path processor adjusts the next hop index value in the tunnel header of the received encapsulated message, in order to identify the next hop in the path identified by the embedded path information. As mentioned above, the path processor adjusts the next hop index value in some embodiments by decrementing this value as the path is specified in the tunnel header by an reverse ordered list of hop IP addresses.

The path processor 622 adjusts the outer header values of the tunnel header to identify its hop's IP address as the source IP address of the encapsulated message, and the IP address of the next hop (now identified by the adjusted next hop index value) as the destination IP address of the encapsulated message. The path processor resolves the next hop's address to a tunnel between the current hop and the next hop. Before sending the encapsulated data message along the resolved tunnel, the path processor in some embodiments adjusts one or more parameters in the data message's tunnel header to reflect the attributes and/or identity of the new tunnel along which the data message will get sent. It then provides the encapsulated data message to its SFE to forward long a tunnel to the next hop.

Figure 7:
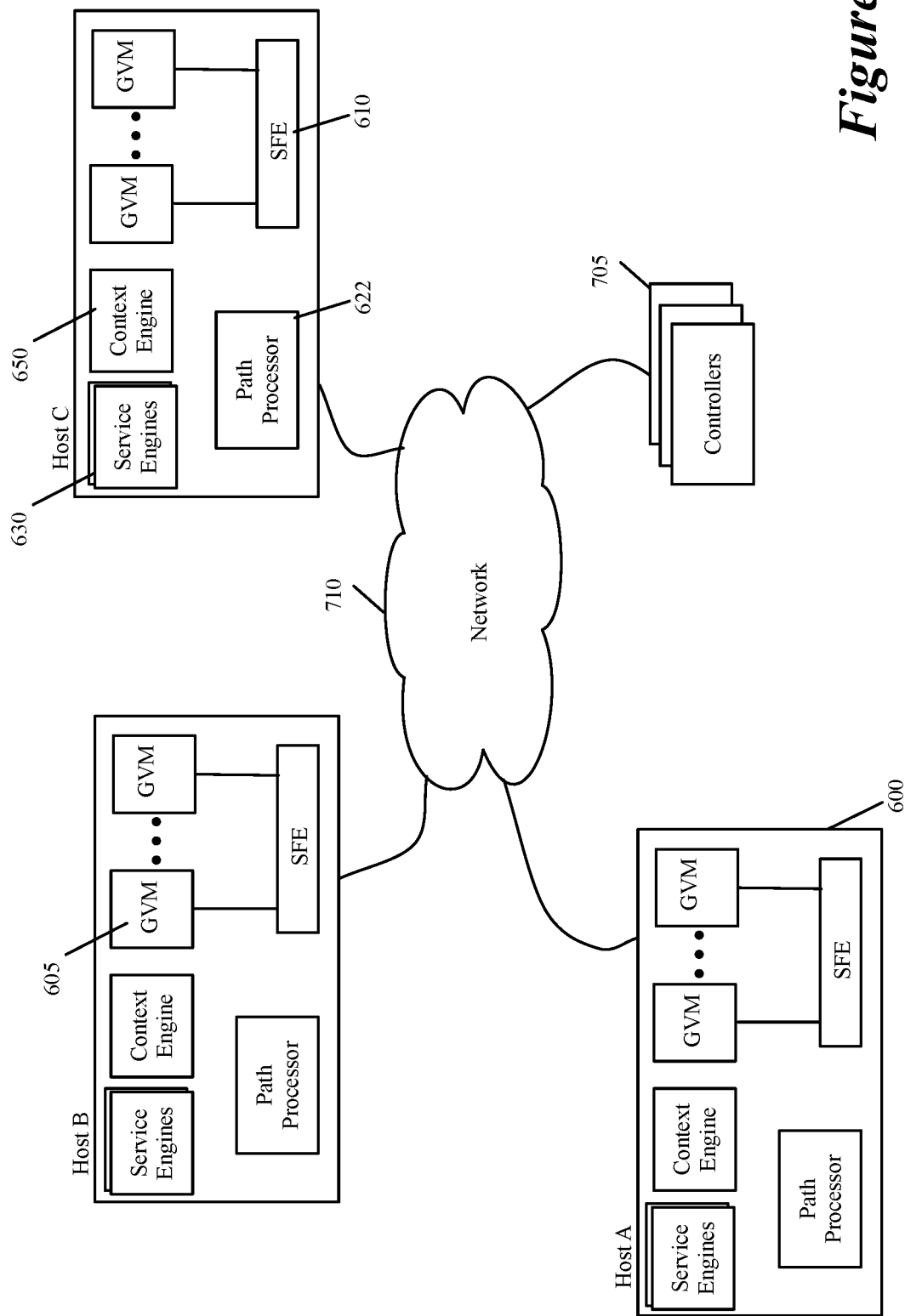
FIG. 7 illustrates an example of how the path processors are managed in some embodiments.

FIG. 7 illustrates an example of how the path-processing filters 622 are managed in some embodiments. This figure illustrates multiple hosts 600 in a datacenter. As shown, each host includes several service engines 630, a context engine 650, a path-processing filter 622, several GVMs 605, and an SFE 610. It also illustrates a set of controllers 705 for managing the path-processing filters 622 and the service engines 630, GVMs 605, and SFEs 610. The hosts and controllers communicatively connect to each other through a network 710, which can be a local area network, a wide area network, a network of networks (such as the Internet), etc.

The controller set provides a user interface for the administrators to define context-based service rules in terms of contextual attributes, and communicates with the hosts through the network 710 to provide these policies. In some embodiments, the context engines 650 collect contextual attributes that are passed to management servers in the controller set through a network 710 so that these contextual attributes can be used to define policies. The management servers in some embodiments interact with discovery engines executing on the host computers 600 in the datacenter to obtain and refresh inventory of all processes and services that are running on the GVMs on the hosts. The management plane in some embodiments then provides a rule creation interface for allowing administrators to create context-based service rules for the service engines and the path processors 622.

Once the high-level service policies are defined in the management plane, the management plane directly supplies some or all of these policies to the management proxies (not shown) on the hosts 600, and/or indirectly supplies some or all of these policies to these proxies through a set of configuring controllers. In some embodiments, the management proxies publish the received policies as rules to the context-based service rule storages 640. In some embodiments, the proxies transform these policies before publishing them to the context-based service rule storages 640. Also, the context engines 650 on the hosts 600 in some embodiments resolve the policies based on collected contextual attributes, in order to generate rules for the service engines.

In some embodiments, different policies are specified for different data message flows from a source GVM based on different traffic content carried by these flows. For instance, one policy might define a path hop list that use low-latency path for a data message flow between two GVMs that is for a video conference involving the executive staff of a corporation, while another policy might define a path hop list that uses low cost path for a data message flow from the same two GVMs when this message flow pertains to a chat between two non-executives.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
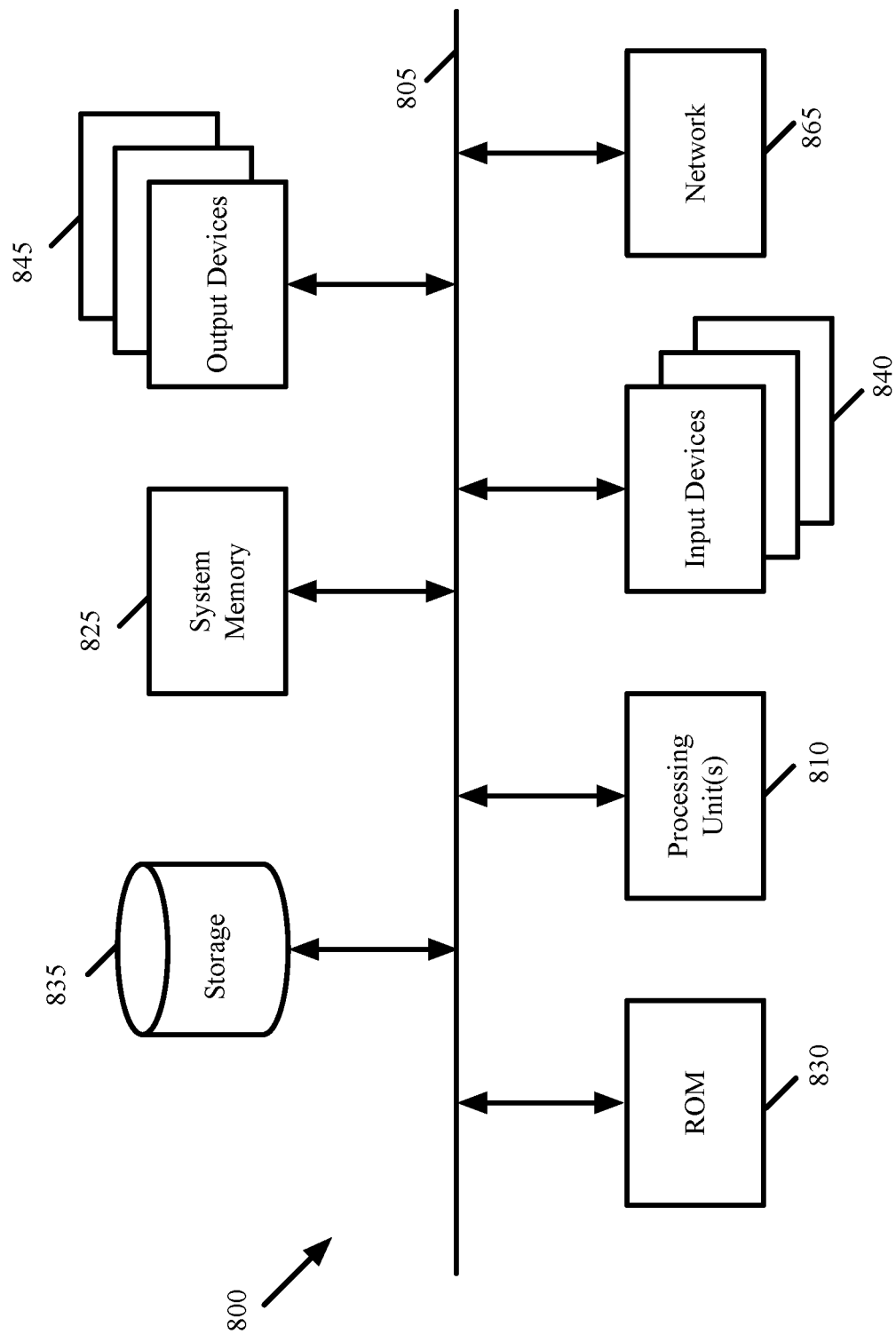
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, and managers. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The above-described methodology is used in some embodiments to express path information in single tenant environments. Thus, one of ordinary skill will realize that some embodiments of the invention are equally applicable to single tenant datacenters. Conversely, in some embodiments, the above-described methodology is used to carry path information across different datacenters of different datacenter providers when one entity (e.g., one corporation) is a tenant in multiple different datacenters of different providers. In these embodiments, the tenant identifiers that are embedded in the tunnel headers have to be unique across the datacenters, or have to be translated when they traverse from one datacenter to the next. Thus, one of ordinary skill in the art would understand that the invention is not to be limited by the foregoing illustrative details, but rather is to be defined by the appended claims.

The invention claimed is:

1. A method of selecting a path for a data message flow through a network comprising a plurality of forwarding elements, the method comprising:
    at a host computer executing a source machine sending the data message flow,
        performing a deep packet inspection (DPI) operation to identify a type of content carried by the data message flow;
        using the identified content type of the data message flow to identify one path-defining rule from a plurality of path-defining rules each of which (i) is stored on the host computer and (ii) specifies a different candidate path from a plurality of candidate paths for the data message flow through the network to a destination of the data message flow; and
        forwarding the data messages of the data message flow along the path specified by the identified path-defining rule, by encapsulating the data messages with tunnel headers that includes a description of the specified path.

2. The method of claim 1, wherein the plurality of paths are traffic-engineered paths that are specified for different types of content carried by different message flows to the same destination from the source machine.

3. The method of claim 2, wherein the data message flow is a first data message flow, the identified path-defining rule is a first path-defining rule, and the specified path is a first specified path, the method further comprising:
    at the host computer:
        identifying a second type of content carried by a second data message flow to the destination;
        from the plurality of path-defining rules specifying the plurality of paths to the destination, using the second content type to identify a second path-defining rule that specifies a second path to the destination; and
        forwarding the data messages of the second data message flow along the specified second path by encapsulating the data messages with tunnel headers that includes a description of the specified second path.

4. The method of claim 3, wherein the source machine sends the first and second data message flows to the destination.

5. The method of claim 2, wherein the forwarding elements along the specified path are connected through a plurality of tunnels that are used to forward data messages for a plurality of tenants, the method further comprising including in each tunnel header a tenant identifier in order to allow multiple traffic-engineered paths of multiple tenants to use a same set of tunnels.

6. The method of claim 1, wherein using the identified content type comprises using the content type and a set of other attributes of the data message flow to perform a classification operation to identify one path defining rule from the plurality of path defining rules.

7. The method of claim 6, wherein the set of other attributes includes data message header values.

8. The method of claim 6, wherein the set of other attributes includes at least one contextual attribute captured for and associated with the data message flow, said contextual attribute comprising an attribute other than the content type, a layer 2 header value, and a layer 3 header value.

9. The method of claim 5, wherein the data message flow is a first data message flow, the identified path-defining rule is a first path-defining rule, the specified path is a first specified path, and the tenant is a first tenant, the method further comprising:
at the host computer:
identifying the first type of content carried by a second data message flow of a second tenant to the destination;
using the identified first content type of the second data message flow to identify a second-path identifying rule from the plurality of path-defining rule that specify the plurality of paths to the destination; and
forwarding the data messages of the data message second flow along a second path specified by the identified second path-defining rule, by encapsulating the data messages of the second data message flow with tunnel headers that includes a description of the specified second path and a second tenant identifier associated with the second tenant.

10. The method of claim 9, wherein the source machine is a first source machine of the first tenant and the second data message flow is sent by a second source machine that executes on the host computer and that is associated with the second tenant.

11. A non-transitory machine readable medium storing a program for selecting a path for a data message flow through a subset of the forwarding elements to a destination in a network comprising a plurality of forwarding elements, the program for execution by a set of hardware processing units of a computer, the program comprising sets of instructions for:
identifying a type of content carried by the data message flow;
using the identified content type of the data message flow to identify one path-defining rule from a plurality of path-defining rules each of which (i) is stored on the host computer and (ii) specifies a different candidate path from a plurality of candidate paths for the data message flow through the network to a destination of the data message flow;
from the plurality of candidate paths through the network to the destination of the data message flow, identifying the path specified by the identified path-defining rule as the path for the data message flow; and
forwarding the data messages of the data message flow along the identified path by encapsulating the data messages with tunnel headers that includes a description of the identified path.

12. The non-transitory machine readable medium of claim 11, wherein the plurality of paths are specified for different types of content carried by different message flows to the same destination from the source machine.

13. The non-transitory machine readable medium of claim 12, wherein the data message flow is a first data message flow, the identified path-defining rule is a first path-defining rule, and the identified path is a first identified path, the program further comprising sets of instructions for:
identifying a second type of content carried by a second data message flow to the destination;
from the plurality of path-defining rules specifying the plurality of paths to the destination, using the second content type to identify a second path-defining rule that specifies a second path to the destination; and
forwarding the data messages of the second data message flow along the identified second path by encapsulating the data messages with tunnel headers that includes a description of the identified second path.

14. The non-transitory machine readable medium of claim 12,
wherein the network is a multi-tenant network and the data message flow associated with a particular tenant,
wherein the forwarding elements along the identified path are connected through a plurality of tunnels that are used to forward data messages for a plurality of tenants,
wherein the program further comprises a set of instructions for including in each tunnel header a tenant identifier identifying the particular tenant in order to allow multiple traffic-engineered paths of multiple tenants to use a same set of tunnels.

15. The non-transitory machine readable medium of claim 14, wherein the multi-tenant network comprises a set of networks of a set of one or more datacenters operated by a single entity.

16. The non-transitory machine readable medium of claim 14, wherein the multi-tenant network comprises a set of networks of multiple public cloud providers.

17. The non-transitory machine readable medium of claim 14, wherein the multi-tenant network comprises at least one private network of one private datacenter and one public network of one public datacenter.

18. The non-transitory machine readable medium of claim 11, wherein the set of instruction for identifying the content type comprises a set of instructions for directing a deep packet inspector to inspect the data messages in the flow to identify the content type.

19. The non-transitory machine readable medium of claim 18, wherein the deep packet inspector executes on the computer along with the program.

20. The non-transitory machine readable medium of claim 11, wherein the identified path is better than the other candidate paths for the identified content type based on a set of one or more path optimization criteria that include at least one of cost, latency, and packet loss.

21. The method of claim 1, wherein each data message has an original header and a payload, and each tunnel header of each data message is an outer tunnel header that encapsulates the data message's payload and original header.

* * * * *